United States Patent
Baron et al.

(10) Patent No.: US 11,227,237 B2
(45) Date of Patent: Jan. 18, 2022

(54) EXCHANGES WITH AUTOMATIC CONSIDERATION OF FACTORS ASSOCIATED WITH THE EXCHANGES

(71) Applicant: Amadeus S.A.S., Biot (FR)

(72) Inventors: Romain Baron, Antibes (FR); Yannick Hoffsess, Antibes (FR); Frederic Hoff, La Roquette sur Siagne (FR); Cedric Dourthe, Nice (FR); Alexandre Chabod, Peymeinade (FR)

(73) Assignee: AMADEUS S.A.S., Biot (FR)

( * ) Notice: Subject to any disclaimer, the term of this patent is extended or adjusted under 35 U.S.C. 154(b) by 588 days.

(21) Appl. No.: 15/902,427

(22) Filed: Feb. 22, 2018

(65) Prior Publication Data
US 2019/0258966 A1 Aug. 22, 2019

(51) Int. Cl.
*G06Q 10/02* (2012.01)
*G06Q 30/06* (2012.01)
*G06F 16/28* (2019.01)

(52) U.S. Cl.
CPC .......... *G06Q 10/02* (2013.01); *G06F 16/285* (2019.01); *G06Q 30/0631* (2013.01)

(58) Field of Classification Search
CPC ......... G06Q 50/10-14; G06Q 30/0631; G06Q 10/02; G06F 16/285; G06F 16/906; G06F 17/18
See application file for complete search history.

(56) References Cited

U.S. PATENT DOCUMENTS

| | | | |
|---|---|---|---|
| 2008/0027768 A1* | 1/2008 | Thurlow | G06Q 10/10 705/6 |
| 2010/0312586 A1* | 12/2010 | Drefs | G06Q 10/02 705/5 |
| 2017/0031931 A1* | 2/2017 | Linda | G06F 16/909 |
| 2018/0075512 A1* | 3/2018 | Bui | G06F 7/08 |
| 2018/0204146 A1* | 7/2018 | Shaffi | G06Q 50/30 |

(Continued)

FOREIGN PATENT DOCUMENTS

| | | |
|---|---|---|
| EP | 2975560 A1 | 1/2016 |
| FR | 3046866 A1 | 7/2017 |
| FR | 3048840 A1 | 9/2017 |

OTHER PUBLICATIONS

Duenyas, Izak. "Unbundling of Ancillary Service: How Does Price Discrimination of Main Service Matter?." Ross School of Business (2015). (Year: 2015).*

(Continued)

*Primary Examiner* — Scott M Tungate
(74) *Attorney, Agent, or Firm* — Thompson Hine LLP

(57) ABSTRACT

Systems, methods, and computer program products for processing exchange requests. An itinerary change request is received to modify at least one attribute of an existing ticket that includes one or more existing ancillary services. A replacement ticket and one or more replacement ancillary services may be identified by identifying a recommendation for a replacement ticket, determining whether the one or more existing ancillary services are available with the replacement ticket, constructing a search filter including category descriptions and a similarity score for the one or more replacement ancillary services, and transmitting the recommendation for the replacement ticket and one or more replacement ancillary services to a user interface.

21 Claims, 6 Drawing Sheets

(56) References Cited

U.S. PATENT DOCUMENTS

2018/0204265 A1* 7/2018 Malviya ................. G06F 40/45
2019/0220827 A1* 7/2019 Cogill .............. G06Q 10/06316

OTHER PUBLICATIONS

National Institute of Industrial Property, Preliminary Search Report issued in French Application No. 1851522 dated Oct. 5, 2018.

* cited by examiner

| Criteria | Weight |
|---|---|
| Same service as before | X1 |
| Service among group | X2 |
| Service among sub-group | X3 |
| History of exchange | X4 |
| Description code 1 | X5 |
| Description code 2 | X6 |

FIG. 4

| Criteria | Weight |
|---|---|
| Cheapest recommendation without services | Y1 |
| Cheapest recommendation with mandatory services | Y2 |
| Cheapest recommendation maintaining level of service | Y3 |

FIG. 5

EXCHANGES WITH AUTOMATIC CONSIDERATION OF FACTORS ASSOCIATED WITH THE EXCHANGES

TECHNICAL FIELD

The invention generally relates to computers and computer software, and in particular to computer software and systems for processing exchange requests.

BACKGROUND

In an all-interconnected world, all large providers of goods and services have now set up database systems holding the characteristics, specifications, and costs of their product and service offerings. Database contents are made accessible, simultaneously, to many online customers possibly from all over the world. Online customers are thus offered the opportunity to query the databases and complete commercial transactions through the use of specific online software applications that let them book and buy various products and services.

In the airline industry, examples of such databases include those databases that hold the inventory of airlines. These databases are used to keep track in real-time of the actual seat capacity and the current state of reservations along with the configurations of the fleet of flights operated by a given airline. In addition, in service industries such as the airline industry, ancillary services represent an increasing source of revenue. For example, airlines are increasingly deriving revenue from add-on and/or unbundled services such as checked bags, priority boarding, beverage/meal services, seat upgrades, etc. Airline inventory databases are either managed by airlines or set up by companies that provide travel services to many actors of the travel industry including the airlines, the traditional travel agencies, and other online travel service providers. Some inventories are directly run by airlines and are interfaced with a global distribution systems (GDS) or a central reservation system (CRS).

An airline's inventory usually contains all flights with their available seats and is generally divided into service classes (e.g., first, business, or economy class) and many booking classes, for which different prices and booking conditions apply. One of the functions of the inventory management is inventory control. Inventory control steers how many seats are available in the different booking classes, for instance by opening and closing individual booking classes offered for sale. In combination with the fares and booking conditions stored in a Fare Quote System, the price for each sold seat is determined. In most cases, inventory control has an interface to an airline's Revenue Management System to support an optimization of the offered booking classes in response to changes in demand. Users may access the inventory of an airline through an availability application having a display and graphical user interface. The inventory contains all offered flights for origin-destination pairs with their available seats in the different booking classes.

Computer technology is increasingly used in the travel industry to manage, support, book, reserve, and process travel reservations as well as data associated therewith. For example, travel websites allow for a user to book various reservations such as airline tickets, train tickets, hotel reservations, or car rentals. Travel providers are also progressively enhancing their merchandising to reflect the different needs and values of their customers. As a consequence of the upward trend for travel provider merchandising, more and more travelers purchase ancillary services (baggage, seat choice, meal, etc.) in addition to their travel ticket with the aim to enhance their travel experience. Also, while air carriers have generated significant profit from ancillary revenue, consumer backlash from charging and/or changing fees for add-on and/or unbundled services can have the adverse effect of damaging a carrier's reputation.

Furthermore, inventory management of extremely perishable goods or resources of service industries that are, at one moment, lost if not sold, is a challenge in many service industries. For example, in the travel industry, service components such as airplane flights and ancillary services have limited resources (e.g., a fixed number of seats or fixed luggage capacity), and as such, when a seat on an airplane flight or luggage capacity on an airplane goes unused, that unused resource represents a loss of revenue to a travel provider. Nonetheless, it is often the case that some resources that are booked or purchased by a customer will not be used, e.g., due to a cancelation by the customer or a change in the customer's itinerary. Business customers in particular may be subject to changing circumstances that may require changes in their travel plans.

When the traveler needs to change their travel plans or journey, e.g., a new travel date or new routing, and use an exchange shopping tool, the booked ancillary services are not automatically taken into consideration in the computation of change proposals. Furthermore, changing the itinerary and/or fares can significantly impact the availability and pricing of booked ancillary services associated with change proposals, e.g., previous searches may not be valid, new services may become valid, prices of services may change, new fares may include free ancillary services, etc. This may result in proposing non-optimal change recommendations that are more expensive once ancillary service are added or may lead to a poor customer experience when paid services are lost or when manual intervention is required.

Conventional travel inventory management computer systems change the travel journey or ticket first and then re-assess previous ancillary services. However, the approach of conventional travel inventory management computer systems may result in non-optimal solutions and a poor customer experience, e.g., services desired by the customer may be lost and customer relationships may be jeopardized. Thus, there is a need for a travel inventory management computer system capable of maintaining a customer's travel experience in the automated ticket change process by providing the best optimized recommendations according to the customer's initial purchased travel package including travel inventory items and travel services.

SUMMARY

According to an embodiment of the invention, a system may include one or more processors and a memory coupled with the one or more processors. The memory stores instructions that, when executed by the one or more processors, may cause the system to exchange an existing ticket when the existing ticket is associated with an ancillary service and the request indicates at least one attribute of the existing ticket to be modified. After receiving the request, the system may be configured to determine that the existing ticket is exchangeable and, if the ticket is exchangeable, the system may be configured to simultaneously identify a first replacement ticket and a first replacement service. Specifically, the system may be configured to identify a recommendation for the first replacement ticket and the recommendation may be based on the attribute(s) of the existing ticket to be modified with the request. Furthermore, the system may be configured to evaluate availability of the ancillary service of the existing ticket with the first replacement ticket. The system may be further configured to construct a search filter and the search filter may include category descriptions for both the ancillary service and a similarity score. Moreover, the system may be configured to locate the first replacement service stored within a database based on the category descriptions of both the search filter and the similarity score; the similarity score may represent a value indicating a degree of similarity between the ancillary service and the first replacement service. The system may be further configured to transmit, to a user interface, the recommendation for the first replacement ticket together with the first replacement service; and after receiving a notification indicating that the first replacement ticket and the first replacement service have been selected by a user at the user interface, update the database by increasing the value of the similarity score of the first replacement service.

In another embodiment, the system may be configured to compare a first combination between the ancillary service and the existing ticket against a second combination of the first replacement ticket and the first replacement service, determine that the ancillary service is irrelevant to the first replacement ticket based on the comparison between the first combination and the second combination; and in response to the ancillary service being determined to be irrelevant to the first replacement ticket, either refund a price associated with the ancillary service or apply the price associated with the ancillary service towards another ancillary service.

In yet another embodiment, the system may be configured to determine that the ancillary service is relevant to the first replacement ticket based on at least one relevancy check.

In another embodiment, the ancillary service may represent a meal service and the first replacement service may be a replacement meal service. Moreover, transmitting, to the user interface, the first replacement ticket together with the first replacement service may include determining that the meal service is compatible with the first replacement ticket based on a departure time and an arrival time of an itinerary associated with the first replacement ticket.

In yet another embodiment, the system may be configured to determine that the ancillary service of the existing ticket is included with a price of the first replacement ticket and transmit, to the user interface, an indicator that the first replacement service is included with the price of the first replacement ticket in response to the ancillary service of the existing ticket being determined to be included with the price of the first replacement ticket. Furthermore, the indicator may be either a notice or a flag.

In another embodiment, the system may be configured to determine that the ancillary service of the existing ticket is not included in a price of the first replacement ticket and transmitting, to the user interface, a cost associated with the first replacement service in response to the ancillary service of the existing ticket being determined to be not included in the price of the first replacement ticket.

In yet another embodiment, the system may be configured to locate a second replacement service for the first replacement ticket, and the system may be configured to classify the first replacement service and the second replacement service as optional services. Moreover, the system may be configured to determine a first weight for the first replacement service; the first weight may represent a first probability based on historical data indicating that the user will select the first replacement ticket with the first replacement service.

The system may also be configured to determine a second weight for the second replacement service; the second weight may represent a second probability based on historical data indicating that the user will select the first replacement ticket with the second replacement service. Moreover, the system may be configured to calculate a first total cost for the first replacement service combined with the first replacement ticket and a second total cost for the second replacement service combined with the first replacement ticket based on the first weight, the second weight, and a price of the first replacement ticket. Furthermore, the system may be configured to rank the first replacement service and the second replacement service based on the first total cost and the second total cost.

In another embodiment, the system may be configured to, in response to determining that the ancillary service of the existing ticket is not applicable with the first replacement ticket, simultaneously identify a second replacement ticket and a second replacement service by identifying a second recommendation for the first replacement ticket and locating, by the computer, the second replacement service stored within the database based on the category descriptions of both the search filter and the similarity score; the second recommendation is based on the at least one attribute of the existing ticket to be modified with the request. Moreover, the system may be configured to determine a first score, based on a criteria, for the recommendation for the first replacement ticket together with the first replacement service, determine a second score, based on the criteria, for the recommendation for the second replacement ticket together with the second replacement service, and determine a high score by comparing the first score and the second score together, such that the high score indicates a best recommendation for a replacement ticket together with a replacement service. Moreover, the system may be configured to transmit, to the user interface, the best recommendation along with an indicator that informs the user that the best recommendation includes the high score. Furthermore, the criteria may indicate a solution having lowest cost and a minimum set of services, a solution having lowest cost and a same level of service as the existing ticket, or a compromise between cost and a level of service.

According to an embodiment of the invention, a method is provided for exchanging an existing ticket when the existing ticket is associated with an ancillary service and the request indicates at least one attribute of the existing ticket to be modified. After receiving the request, the computer may determine that the existing ticket is exchangeable and, if the ticket is exchangeable, the computer may simultaneously identify a first replacement ticket and a first replacement service. Specifically, the method may include identifying a recommendation for the first replacement ticket and the recommendation may be based on the attribute(s) of the existing ticket to be modified with the request. Furthermore, the method may include evaluating by the computer availability of the ancillary service of the existing ticket with the first replacement ticket. The method may further include constructing a search filter by the computer and the search filter may include category descriptions for both the ancillary service and a similarity score. Moreover, the method may include locating, by the computer, the first replacement service stored within a database based on the category descriptions of both the search filter and the similarity score; the similarity score may represent a value indicating a degree of similarity between the ancillary service and the first replacement service. The method may further include transmitting, to a user interface, the recommendation for the first replacement ticket together with the first replacement service; and after receiving a notification indicating that the first replacement ticket and the first replacement service have been selected by a user at the user interface, updating the database by increasing the value of the similarity score of the first replacement service.

In another embodiment, the method may include comparing a first combination between the ancillary service and the existing ticket against a second combination of the first replacement ticket and the first replacement service, determining that the ancillary service is irrelevant to the first replacement ticket based on the comparison between the first combination and the second combination; and in response to the ancillary service being determined to be irrelevant to the first replacement ticket, either refunding a price associated with the ancillary service or applying the price associated with the ancillary service towards another ancillary service.

In yet another embodiment, the method may include determining that the ancillary service is relevant to the first replacement ticket based on at least one relevancy check.

In another embodiment, the ancillary service may represent a meal service and the first replacement service may be a replacement meal service. Moreover, transmitting, to the user interface, the first replacement ticket together with the first replacement service may include determining that the meal service is compatible with the first replacement ticket based on a departure time and an arrival time of an itinerary associated with the first replacement ticket.

In yet another embodiment, the method may include determining that the ancillary service of the existing ticket is included with a price of the first replacement ticket and transmitting, to the user interface, an indicator that the first replacement service is included with the price of the first replacement ticket in response to the ancillary service of the existing ticket being determined to be included with the price of the first replacement ticket. Furthermore, the indicator may be either a notice or a flag.

In another embodiment, the method may include determining that the ancillary service of the existing ticket is not included in a price of the first replacement ticket and transmitting, to the user interface, a cost associated with the first replacement service in response to the ancillary service of the existing ticket being determined to be not included in the price of the first replacement ticket.

In yet another embodiment, a second replacement service for the first replacement ticket may be located, and the first replacement service and the second replacement service may be classified as optional services. Moreover, the method may include determining a first weight for the first replacement service; the first weight may represent a first probability based on historical data indicating that the user will select the first replacement ticket with the first replacement service. The method may also include determining a second weight for the second replacement service; the second weight may represent a second probability based on historical data indicating that the user will select the first replacement ticket with the second replacement service. Moreover, the method may include calculating a first total cost for the first replacement service combined with the first replacement ticket and a second total cost for the second replacement service combined with the first replacement ticket based on the first weight, the second weight, and a price of the first replacement ticket. Furthermore, the method may include ranking the first replacement service and the second replacement service based on the first total cost and the second total cost.

In another embodiment, the method may include, in response to determining that the ancillary service of the existing ticket is not applicable with the first replacement ticket, simultaneously identifying a second replacement ticket and a second replacement service by identifying a second recommendation for the first replacement ticket and locating, by the computer, the second replacement service stored within the database based on the category descriptions of both the search filter and the similarity score; the second recommendation is based on the at least one attribute of the existing ticket to be modified with the request. Moreover, the method may include determining a first score, based on a criteria, for the recommendation for the first replacement ticket together with the first replacement service, determining a second score, based on the criteria, for the recommendation for the second replacement ticket together with the second replacement service, and determining a high score by comparing the first score and the second score together, such that the high score indicates a best recommendation for a replacement ticket together with a replacement service. Moreover, the method may include transmitting, to the user interface, the best recommendation along with an indicator that informs the user that the best recommendation includes the high score. Furthermore, the criteria may indicate a solution having lowest cost and a minimum set of services, a solution having lowest cost and a same level of service as the existing ticket, or a compromise between cost and level of service.

In another embodiment of the invention, a computer program product may be provided that includes a non-transitory computer-readable storage medium including instructions. The instructions may be configured, when executed by the processor, to exchange an existing ticket when the existing ticket is associated with an ancillary service and the request indicates at least one attribute of the existing ticket to be modified. After receiving the request, the instructions may be configured to determine that the existing ticket is exchangeable and, if the ticket is exchangeable, the instructions may be configured to simultaneously identify a first replacement ticket and a first replacement service. Specifically, the instructions may be configured to identify a recommendation for the first replacement ticket and the recommendation may be based on the attribute(s) of the existing ticket to be modified with the request. Furthermore, the instructions may be configured to determine that the ancillary service of the existing ticket is not applicable with the first replacement ticket. The instructions may be further configured to construct a search filter and the search filter may include category descriptions for both the ancillary service and a similarity score. Moreover, the instructions may be configured to locate the first replacement service stored within a database based on the category descriptions of both the search filter and the similarity score; the similarity score may represent a value indicating a degree of similarity between the ancillary service and the first replacement service. The instructions may be further configured to transmit, to a user interface, the recommendation for the first replacement ticket together with the first replacement service; and after receiving a notification indicating that the first replacement ticket and the first replacement service have been selected by a user, update the database by increasing the value of the similarity score of the first replacement service.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 4 is a schematic illustrating exemplary criteria and exemplary associated weights consistent with embodiments of the invention.

FIG. 5 is a schematic illustrating exemplary criteria and exemplary associated weights consistent with embodiments of the invention.

DETAILED DESCRIPTION

Embodiments of the invention provide systems, methods, and computer program products for processing travel requests, managing inventory for travel services, and/or managing travel reservations.

Figure 1:
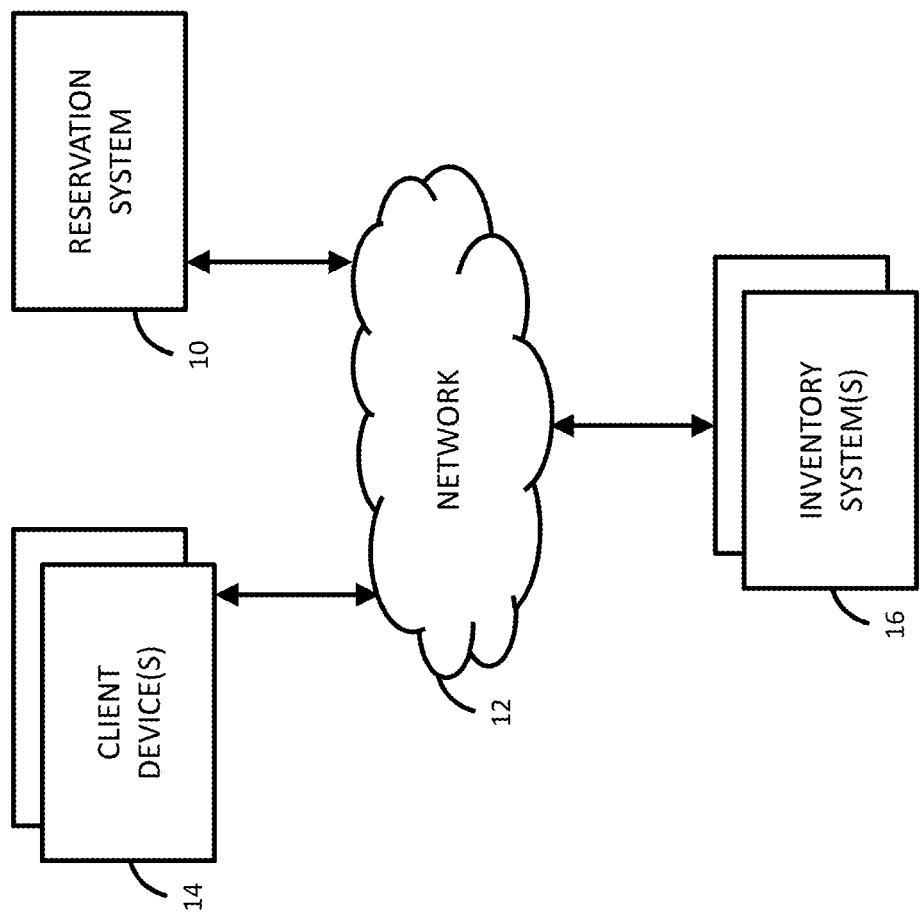
FIG. 1 is a schematic view of a reservation system, one or more inventory systems, and one or more client devices consistent with embodiments of the invention.

Turning now to the figures and particularly to FIG. 1, this figure provides a block diagram illustrating the one or more devices and/or systems consistent with embodiments of the invention. As shown in FIG. 1, a reservation system 10 may be implemented as one or more servers. The reservation system 10 may be connected to a communication network 12, where the communication network 12 may comprise the Internet, a local area network (LAN), a wide area network (WAN), a cellular voice/data network, one or more high speed bus connections, and/or other such types of communication networks. One or more client devices 14 may be connected to the communication network 12, such that a customer or reservation agent (e.g., travel agency or other such travel reservation service) may initialize a reservation session with the reservation system 10 to communicate a travel request and/or other such relevant data to the reservation system 10. The client device 14 may be a personal computing device, tablet computer, thin client terminal, smart phone and/or other such computing device.

One or more servers for one or more inventory systems 16 of one or more travel merchants are connected to the communication network 12. The reservation system 10 may initialize an inventory session over the communication network 12 with each inventory system 16 for which a travel inventory item is to be booked. Consistent with embodiments of the invention, a reservation agent or customer (i.e., a traveler) may interface with the reservation system 10 using the client device 14 in a reservation session to provide data for a travel request. In turn, the reservation system 10 may interface with each inventory system 16 of each travel merchant that provides a travel inventory item associated with the travel request that generally requires an availability determination (e.g., a flight, rail ticket, hotel room, event ticket, etc.) to determine availability. Furthermore, as will be appreciated, in some embodiments the reservation system 10 and/or inventory system 16 may be components of a global distribution system (GDS).

As will be described in detail below, consistent with embodiments of the invention, an interface may be generated by the reservation system 10 such that a user (i.e., a traveler or a travel agent) may input information at a client device 14 that may be utilized to generate a travel request that may in turn be used to determine one or more travel solutions consistent with embodiments of the invention. To determine the one or more travel solutions, the reservation system 10 interfaces with one or more inventory systems 16 to determine an availability for travel inventory items to be booked for a travel solution. In this regard, the reservation system 10 may communicate an availability request to the inventory system 16, and the inventory system 16 may determine an availability for each requested travel inventory item. An availability response may be communicated to the reservation system 10 that includes the determined availability for each travel inventory item of the availability request. Consistent with some embodiments of the invention, the inventory system 16 may determine availability for a travel inventory item, including ancillary services. For example, baggage services, meal services, lounge access, extended boarding time, priority boarding, and/or other such ancillary services may be determined for a traveler. Once availability has been determined for the one or more travel inventory items of the one or more travel solutions, the reservation system 10 may communicate a travel response to the client device 14 that identifies the travel inventory items, availability, and/or fares for each travel solution.

Figure 2:
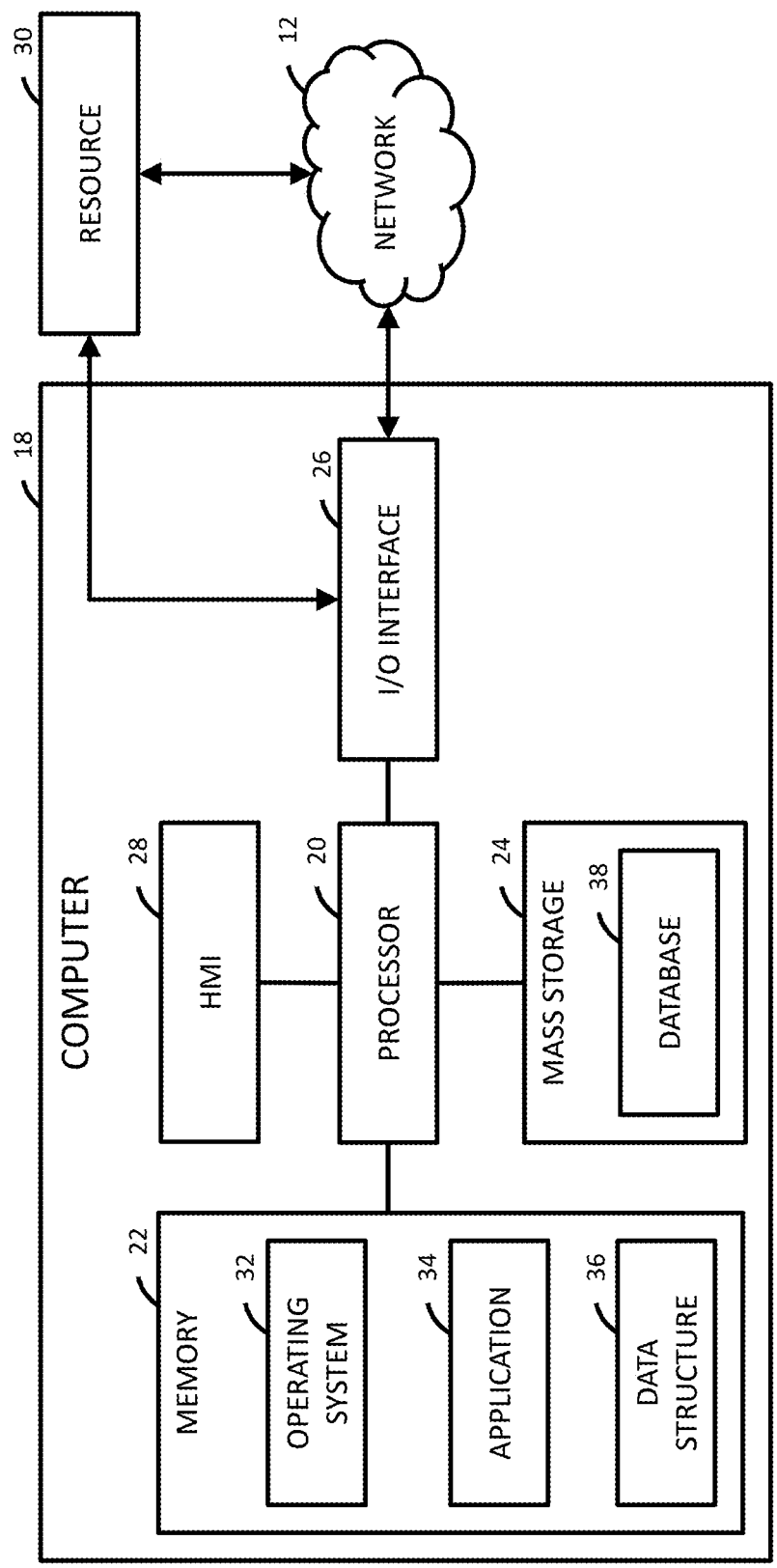
FIG. 2 is a schematic view of an exemplary computer system of FIG. 1.

With reference to FIG. 2, the travel inventory computer system may be implemented on one or more computer devices or systems, such as exemplary computer system 18. The computer system 18 may include a processor 20, a memory 22, a mass storage memory device 24, an input/output (I/O) interface 26, and a Human Machine Interface (HMI) 28. The computer system 18 may also be operatively coupled to one or more external resources 30 via the communication network 12 or I/O interface 26. External resources 30 may include, but are not limited to, servers, databases, mass storage devices, peripheral devices, cloud-based network services, or any other suitable computer resource that may be used by the computer system 18.

The processor 20 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 22. The memory 22 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 24 may include data storage devices such as a hard drive, optical drive, tape drive, non-volatile solid state device, or any other device capable of storing information.

The processor 20 may operate under the control of an operating system 32 that resides in the memory 22. The operating system 32 may manage computer resources so that computer program code embodied as one or more computer software applications, such as an application 34 residing in memory 22, may have instructions executed by the processor 20. In an alternative embodiment, the processor 20 may execute the application 34 directly, in which case the operating system 32 may be omitted. One or more data structures 36 may also reside in memory 22, and may be used by the processor 20, operating system 32, or application 34 to store or manipulate data.

The I/O interface 26 may provide a machine interface that operatively couples the processor 20 to other devices and systems, such as the communication network 12 or the one or more external resources 30. The application 34 may thereby work cooperatively with the communication network 12 or the external resources 30 by communicating via the I/O interface 26 to provide the various features, functions, applications, processes, or modules comprising embodiments of the invention. The application 34 may also have program code that is executed by the one or more external resources 30, or otherwise rely on functions or signals provided by other system or network components external to the computer system 18. Indeed, given the nearly endless hardware and software configurations possible, persons having ordinary skill in the art will understand that embodiments of the invention may include applications that are located externally to the computer system 18, distributed among multiple computers or other external resources 30, or provided by computing resources (hardware and software) that are provided as a service over the communication network 12, such as a cloud computing service.

The HMI 28 may be operatively coupled to the processor 20 of computer system 18 in a known manner to allow a user to interact directly with the computer system 18. The HMI 28 may include video or alphanumeric displays, a touch screen, a speaker, and any other suitable audio and visual indicators capable of providing data to the user. The HMI 28 may also include input devices and controls such as an alphanumeric keyboard, a pointing device, keypads, push-buttons, control knobs, microphones, etc., capable of accepting commands or input from the user and transmitting the entered input to the processor 20.

A database 38 may reside on the mass storage memory device 24, and may be used to collect and organize data used by the various systems and modules described herein. The database 38 may include data and supporting data structures that store and organize the data. In particular, the database 38 may be arranged with any database organization or structure including, but not limited to, a relational database, a hierarchical database, a network database, or combinations thereof. A database management system in the form of a computer software application executing as instructions on the processor 20 may be used to access the information or data stored in records of the database 38 in response to a query, where a query may be dynamically determined and executed by the operating system 32, other applications 34, or one or more modules.

Figure 3:
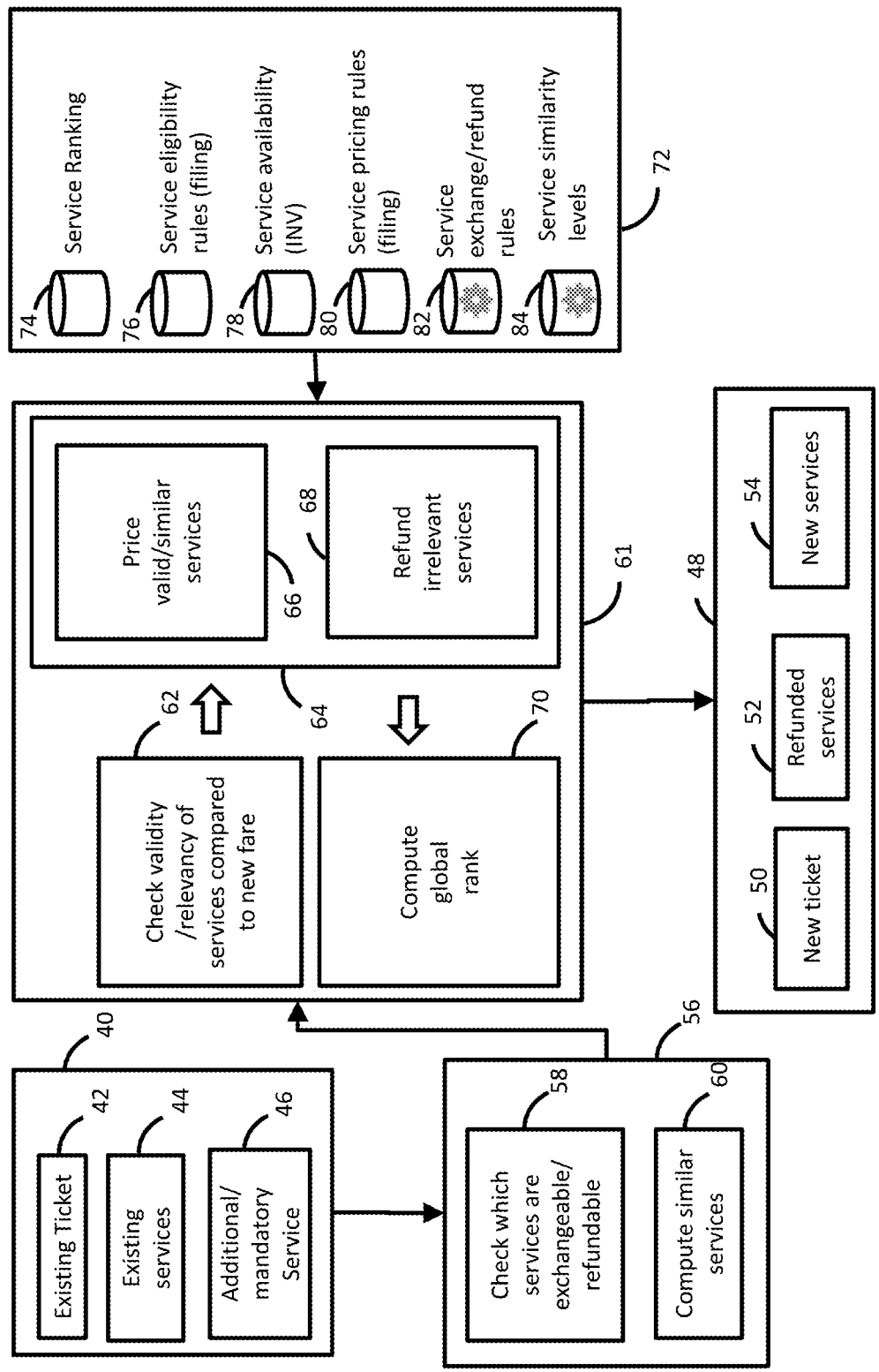
FIG. 3 is a flowchart illustrating a sequence of operations that can be performed by reservation system of FIG. 1 to perform an itinerary change request.

Turning now to FIG. 3, this figure provides a flowchart that illustrates a sequence of operations that may be performed by the reservation system 10 (shown in FIG. 1) consistent with embodiments of the invention to process an itinerary change request 40, including an existing ticket 42 and associated existing ancillary services 44 and any additional and/or mandatory service selections 46. In response to receipt of the itinerary change request 40, the reservation system 10 maintains a customer's travel experience in an automated ticket change process by providing one or more optimized recommendations 48 according to the customer's initial purchased package, including one or more replacement tickets 50, any applicable refunded services 52, and one or more new or replacement ancillary services 54.

As shown, the reservation system 10 receives an existing ticket 42 along with an itinerary change request 40. Furthermore, the existing ticket 42 may include associated existing ancillary services 44 and the itinerary change request 40 may include selections of additional and/or mandatory services 46. The reservation system 10 may then determine, in block 56, which services are exchangeable and/or refundable 58 and compute similar services 60.

Unlike conventional reservation systems which are not capable of replacing existing services with similar replacement services when existing services cannot be offered with the replacement ticket, in an embodiment, the reservation system 10 may take into account not only the existing ticket 42 and/or the existing ancillary services 44, but also similar services to the existing ancillary services 44 in order to compute and propose optimized recommendations 48 with replacement ticket 50 and replacement ancillary services 54, based on the initial purchased package. Exemplary service information relating to new and/or replacement services considered by the reservation system 10 may include the effective dates, discontinue dates, reason for issuance codes (RFIC), reason for issuance sub codes (RFISC), group, sub-group, service classification, and industry/carrier defined subcodes of the ancillary services.

For this purpose, the reservation system 10 may compute and store for each ordered pair of existing and new ancillary services, e.g. $S_i$ (existing ancillary service 44) & $S_j$ (replacement ancillary service 54), a similarity value, e.g. Similarity $(S_i, S_j)$. Moreover, this similarity value may measure how relevant it would be to offer service $S_j$ as a replacement ancillary service 54 for $S_i$ (existing ancillary service 44) in case $S_i$ cannot be offered. For example, a similarity value of 0 may mean that the existing ancillary service 44 and proposed replacement ancillary service 54 are not similar at all and a higher similarity value may mean that the services are more similar. Furthermore, in an embodiment, Similarity $(S_i, S_j)$ and Similarity $(S_j, S_i)$ may hold or represent different values, i.e. the similarity value does not have to be reflective with respect to $S_i$ and $S_j$.

In an embodiment, a database of similarity values 84 may be populated with initial values. Thus, each time an airline or travel inventory supplier decides to offer a new ancillary service, the reservation system 10 may populate the database of similarity values 84 with initial values, e.g. similarity values representing relationships between the new ancillary service and all existing ancillary services. The reservation system 10 may compute initial similarity values using rules based on the attributes entered by airlines when they define their ancillary services in the pricing systems. For example, airlines may use Airline Tariff Publishing Company (ATPCO) Optional Services S5 records to define their services and share these records with distribution systems via ATPCO. These records include several encoded attributes, e.g., group, sub-group, and description codes. When using ATPCO, airlines can only choose standard values for these attributes, as defined by ATPCO, e.g., group ML means Meal, sub-group LU means Lunch, and description code VG means Vegetarian.

In an exemplary embodiment, the initial similarity value, Similarity($S_i$, $S_j$), may be defined as follows: 25 if services $S_i$ and Sj have the same group, sub-group and description codes, 20 if they have the same group and sub-group (but different description codes), and 10 if they have the same group (but different sub-groups) and 0 if they belong to different groups. As an example, if $S_i$ is a Vegetarian lunch service with group ML (Meal), sub-group LU (Lunch) and description code VG (Vegetarian), the similarity values of 25, 20, 10 and 0 with those other services may be as follows: 20 with service Lunch whose group and sub-group are the same (ML/LU), although description codes may differ (e.g. empty description code for Lunch); 10 with service Alcoholic drink whose group is also ML but sub-group is DR (Drink) and description code AL (Alcoholic); 0 with service Pet in cabin whose group is PT (Pet) and sub-group PC (Pet in cabin). The initial similarity values computed with the simple exemplary algorithm defined supra may be adjusted manually based on information provided by airlines (e.g. in ATPCO S5 free text description). For example, if two services belong to the same group but it appears clearly from the information provided by the airline that they are completely different, the initial value of 10 could be decreased manually in the database.

When a traveler decides to change their existing ticket 42 and associated existing ancillary services 44, the system will propose new optimized recommendations 48. Each optimized recommendation 48 will include proposals for a replacement ticket 50 and new associated replacement ancillary services 54. The computation of these optimized recommendations 48 will use the database of similarity values as described earlier, to replace existing ancillary services 44 with similar ancillary services if needed. The traveler can select one of the optimized recommendations 48 returned by the system. Once an optimized recommendation 48 is selected, the traveler can either accept it as it is or modify the associated replacement ancillary services 54. For this purpose, the system will display a catalogue of all services that can be associated with the new ticket. Services that were included in the optimized recommendation 48 will be selected by default but the traveler can unselect them and/or select other services. The traveler's choice may be stored by the system and used to update the database of similarity values.

Furthermore, advanced methods of data mining and machine learning may be used to predict or anticipate traveler selection. For example, every time a traveler decides to purchase a service $S_j$ as a replacement for existing service $S_i$, the similarity value Similarity($S_i$, $S_j$) may be increased by one. Thus, the more travelers choose $S_j$ as a replacement for Si, the more the Similarity($S_i$, $S_j$) value will be increased, and the more $S_j$ will be considered as a replacement for Si for initial solutions returned by the system. In an embodiment, a machine learning process may include a statistical analysis that counts the number of times a characteristic of a traveler is associated with a certain ancillary service. The higher the count, the stronger the association between that characteristic and the ancillary service will be. This count data may be used to generate the classification rules.

For each flight recommendation, the reservation system 10 may, in block 61, check the validity and/or relevancy of existing ancillary services 62 when applied to the new fare associated with the itinerary change request 40. Moreover, the reservation system 10 may, in block 64 determine the price of valid and/or similar services (block 66). In an embodiment, the reservation system 10 may, in block 64, deem existing services as irrelevant based on the itinerary change request 40 and may refund irrelevant services 68. Furthermore, the reservation system 10 may, in block 70, compute a global rank for the flight recommendation and services based on previous traveler preferences.

To address the failure of conventional reservation systems to identify relationships between existing ancillary services and replacement ancillary services, in an embodiment, the reservation system 10 may compute and store ancillary service relationship or relevancy rules in a service similarity levels database 84. In an embodiment, once a threshold value has been exceeded, the count for a given characteristic-service association may form the basis for a weight associated with a relationship rule, where the characteristic-service association relates a characteristic of a traveler, an existing ticket, and/or an existing ancillary service to a replacement ancillary service. For example, if the count for a given characteristic-classification relationship is within a first predefined range, then the machine learning process may set the weight associated with the corresponding relationship rule as a first predetermined value, and if the count for a given characteristic-service relationship is within a second predefined range, then the machine learning process may set a weight associated with the corresponding relationship rule as a second value, and so on. Besides the count data, a machine learning algorithm may identify and use any other statistical data from the received data relating to the travelers and/or ancillary services that would be recognized as useful by those skilled in the art.

In an embodiment, relevancy may also be used by the reservation system 10 to determine appropriate replacement ancillary services 54. When an existing ancillary service 44 is considered as irrelevant, the reservation system 10 may not try to offer it with the replacement ticket 50. Instead, the reservation system 10 may attempt to refund this service (if it is refundable) or reuse the amount paid for another service (if it is exchangeable). On the other hand, some existing ancillary services 44 that were not purchased initially may be considered as relevant by the reservation system 10 to the replacement ticket 50 and may be automatically priced and proposed.

Furthermore, existing ancillary services 44 may be considered as irrelevant due to fare family changes. Airline fares are often categorized in fare families, i.e., branded fares, which includes not only fares but also possibly ancillary services for no additional charge. When a traveler purchases a ticket and then wants to exchange it, the fare family used for the first pricing and the one used at exchange time may differ and in particular, the free ancillary services may not be the same. For this reason, a traveler could purchase an ancillary service, e.g., lounge access, that was not included for free in the existing fare family, but then the same ancillary service could be included for free in the new fare family. In such situations, there is no need to reissue an EMD for that service with the new ticket: the existing ancillary service 44 is automatically considered as irrelevant by the reservation system 10 for the replacement ticket 50 because the existing ancillary service 44 is already included with the replacement ticket 50 for free.

Existing ancillary services 44 may also be considered as irrelevant due to baggage allowance changes. Similarly, the free baggage allowance associated to the existing ticket 42 and the replacement ticket 50 may not be the same. If the existing baggage allowance was not sufficient, the traveler could have purchased an additional baggage service, e.g., prepaid baggage service, but then the new baggage allowance may be more generous and already include this additional baggage. In such a situation, there is no need to reissue that EMD; the additional baggage service is considered as irrelevant by the system for the new ticket because the baggage service is already included for free.

In an embodiment, another type of relevancy check done by the reservation system 10 relates to meal services. For example, meal services may be considered as irrelevant due to time changes. Furthermore, if the departure and arrival times of the flights on the replacement ticket 50 are not the same as for the existing ticket 42, then some meal services existingly purchased by the traveler may become irrelevant. As an example, if a lunch service, e.g., group ML, sub-group LU, was originally purchased for a flight around noon, but the new ticket is later in the afternoon on another day, e.g., around 4 p.m., the system may automatically consider the existing lunch service as irrelevant for the new ticket and will not reissue it. Other such relevancy checks based on groups/sub-groups of existing services and characteristics of the ticket change could be added as well.

While existing ancillary services 44 explicitly purchased by the traveler with the initial ticket and afterwards considered as irrelevant by the reservation system 10 at the time of exchange have been discussed supra, new services may also be considered as relevant to maintain the previously booked level of service. For example, some services could have been initially included for free with the existing ticket 42 as part of the fare family, i.e., branded fare; although the traveler did not purchase explicitly such services, they were included in the initial ticket offer, e.g., a free baggage allowance. If some of such services originally included for free with the initial ticket offer are not included for free with the new ticket due to, for example, different fare family and/or different baggage allowance, the reservation system 10 may automatically price them and propose them to maintain the level of service. The traveler may still choose afterwards, at a confirmation step, what replacement ancillary services 54 are actually purchased; i.e., if the traveler does not need one of the existing ancillary services 44 that were originally included for free with the existing ticket 42, he or she may remove the existing ancillary service 44 at exchange time if the system proposes it for an additional charge.

As shown in block 72, the reservation system 10 may utilize exemplary information and/or information databases in computing recommendations, including ancillary service ranking 74, ancillary services eligibility rules 76, ancillary service availability 78, ancillary service pricing rules 80, ancillary service exchange and/or refund rules 82, and ancillary service similarity levels 84.

In order to compute the best recommendations and return them to the traveler, the reservation system 10 may rank or categorize the optimized recommendations 48 and store the rankings in a service ranking database 86. Exemplary categories may include, for example: cheapest solutions with minimum set of services; cheapest solutions with same level of service as the original package; and compromises between price and level of service. Moreover, the reservation system 10 may search for all categories at the same time and associate each solution computed to one of the categories.

The exemplary category consisting of exemplary cheapest solutions may provide basic and inexpensive offers including a minimum set of services. Only the price of the ticket and the services explicitly flagged as mandatory by the traveler are considered in the ranking process, while the validity and price of any other service is ignored in the ranking. Moreover, each exemplary optimized recommendation 48 must contain all the mandatory services or a valid similar service as a replacement, except for the services that the system assessed as irrelevant. Other services are not considered. Consequently, this category contains cheap solutions with a lower level of service.

The exemplary category consisting of cheapest solutions with same level of service as the original package may contain offers having lowest cost and same level of service, as well as offers that are more expensive but with the same level of service as the original package. Not only mandatory services are included, but also other original services must be either valid or replaced by similar services, unless the reservation system 10 assessed they are irrelevant with the replacement ticket 50. In addition, new relevant services must be added if needed to keep the same level of service.

The exemplary category consisting of best compromises between price and level of service using data mining contains other solutions with at least mandatory services or similar services, except when irrelevant but possibly also a subset of other services as well. For each non-mandatory service, the system computes a weight equal to the probability that the traveler will choose to keep the service with the new ticket. The following exemplary probability weight (between 0 and 1) may then used to compute the total price of the offer: Price_Offer=Price_Ticket+sum (Price_Mandatory_Service)+sum (Probabilty_Weight×Price_Optional Service). The higher the probability, the more the price of the service plays a role in the total price for the offer. Then the optimized recommendations 48 may be ranked from the cheapest total price (Price_Offer) to the most expensive one.

To estimate the probability that the traveler will choose to keep the service, the reservation system 10 may analyze all the previous ticket changes made by other travelers that included the same existing ancillary service 44. The reservation system 10 may then compute the ratio between the number of times the service (or a similar one used as a replacement) was kept by the traveler at confirmation step versus the total number of ticket changes with this existing service. As an example, if for 70% of the previous ticket changes with a given existing service $S_i$, the traveler decided to keep $S_i$ (or a similar service proposed as a replacement by the system) with the new ticket, then the probability weight used by the reservation system 10 is 0.7 for $S_i$. This data mining process can be implemented for all tickets associated with a given service as described supra, or more advanced machine learning techniques can be used to identify ticket patterns and focus on the ticket pattern matching the current ticket. Consequently, this category will contain compromises between total price and level of service, taking into account the choices made by previous travelers with same services.

In situations where a traveler requests a simple ticket change with no ancillary services involved and the search for new travel solutions already has a significant computation cost, e.g., when flights must be combined together to have full itineraries, fares must be combined together to match itineraries, or flights and fares must be combined together to get priced journeys, there may be many combinations. The process for each potential solution may include: checking flight availabilities and fare rules; checking original ticket reissue restrictions against new flights and fares; and computing surcharges, taxes and fees. In an exemplary embodiment, all computations must be made inside a search engine to find the cheapest recommendations. Search engines rely on optimizations and heuristics to find and return the best travel solutions without computing all of them and, while the exemplary list of possible computations and combinations is not meant to be exhaustive, it shows why it is usually not possible to compute all combinations. Adding ancillary services into the scope of an exemplary exchange request has a significant impact on the operational complexity because the process to validate and price ancillary services also has a significant computational cost with the same kind of combinatorial complexity as fares. For this reason, it is not realistic to add the process of ancillary services in the search for ticket change without relevant optimizations to limit the increase of the response time.

FIGS. 4 and 5 illustrate exemplary criteria and exemplary associated weights that may be utilized by the reservation system 10. Table 86 shows, for example, exemplary criteria and associated weights that may be utilized by the reservation system 10 including same service as before with an exemplary weight of X1, service among group with an exemplary weight of X2, service among sub-group with an exemplary weight of X3, history of exchange with an exemplary weight of X4, description code 1 with an exemplary weight of X5, and description code 2 with an exemplary weight of X6. Further exemplary criteria and associated weights, shown in table 88, may include cheapest recommendation without services with an exemplary weight of Y1, cheapest recommendation with mandatory services with an exemplary weight of Y2, and cheapest recommendation maintaining level of service with an exemplary weight Y3.

In an embodiment, the reservation system 10 may recursively repeat one or more of the aforementioned steps to compute an optimal balance of the validity, relevancy, price, and traveler preferences of recommended replacement tickets 50 and recommended replacement ancillary services 54.

In case existing services are not valid for a given optimized recommendation 48, the reservation system 10 may need to replace them with similar services. Rather than identifying similar services in the search loop (block 61), possibly for each travel solution, it may be more efficient to make the replacements prior to the search loop (block 61). For each existing ancillary service 44, the reservation system 10 may compute a list of similar services ranked from the most similar to the least similar. Then this list may be used whenever needed during the search process (block 61) when some existing ancillary services 44 are not valid for an optimized recommendation 48. If the reservation system 10 determines existing ancillary services 44 are not relevant anymore, the reservation system 10 will compute what part of their amounts can be refunded. This does not depend on the optimized recommendation 48, thus, like the list of similar services, these refundable amounts must also be computed upfront before the main search loop (block 61).

In an embodiment, the flight domain and the fare domain may be filtered based on reissue restrictions. Reissue restrictions associated to ancillary services can include criteria relating to passenger type, itinerary, flights, fares, dates, etc. Such restrictions may be stored in the ancillary services eligibility rules database 76, a database of rules defining for each ancillary service whether it is applicable or not for a given passenger and ticket. Additional restrictions may be stored in the ancillary service exchange and/or refund rules 82, a database of rules defining for each ancillary service whether it can be exchanged or not, against what services it can be exchanged, and also whether it can be refunded. Reissue restrictions can also be used to filter the search domain, both flights and fares, before the search process (block 61) to save time.

Mandatory services may be processed first so that solutions that are not compatible with the existing services considered as mandatory by the traveler, and not compatible with similar services either, are discarded by the system. For this reason, it may be more efficient to process these services first and avoid processing other services in case the mandatory services are not valid.

To improve the response time, it is also possible to check reissue restrictions and eligibility/pricing rules associated to each ancillary service in advance, before the change request. Exemplary pricing policy considerations that can be considered by the reservation system 10 may include considerations such as re-pricing authorization, residual value collection, and the process dates associated with the ancillary services. The reservation system 10 can check these restrictions and rules to identify upfront what types of ticket changes will make a service ineligible and what types of ticket changes will make the service price change and how much. For example, many ticket changes are simply changes of dates, with the same origin and destination but on a later date. The system can check at the time of original issue, for each purchased ancillary service, what date range would be valid with no impact on eligibility and price. The reservation system 10 can then anticipate future changes of dates, e.g., if the traveler requests later to postpone the trip, the reservation system 10 may already know that such ancillary service will remain unchanged and can be ignored in the search process (block 61), excepting the availability check if the service is subject to availability restrictions.

For example, an exemplary itinerary change request 40 may include an existing ticket 42 with an existing price of $100, and may include existing ancillary services 44 of two free bags or luggage items. Furthermore, the exemplary itinerary change request 40 may also include an existing ancillary service 44 of a vegetarian meal for $20. The reservation system 10 may then compute one or more optimized recommendations 48 for replacement tickets 50 and associated replacement ancillary services 54. An exemplary basic optimized recommendation 48 may be provided in which reduced or no replacement ancillary services 54 are provided, e.g. no baggage is included. Alternatively, additional replacement ancillary services 54 may be provided in addition to the basic journey, e.g., two bags or luggage items and associated price. Furthermore, the reservation system 10 may determine the relevancy of existing ancillary services 44 and, if relevant, similar replacement ancillary services 54 to the existing ancillary services 44 may be proposed, e.g. vegetarian meal. Furthermore, as another example of additional similar replacement ancillary services 54, the reservation system 10 may propose additional meal options that are similar to the existing vegetarian meal, e.g. gluten-free and vegetarian meals. The traveler's selections may then be recorded and used to better determine relevancy and/or similarity in future traveler interactions with the reservation system 10.

Figure 6:
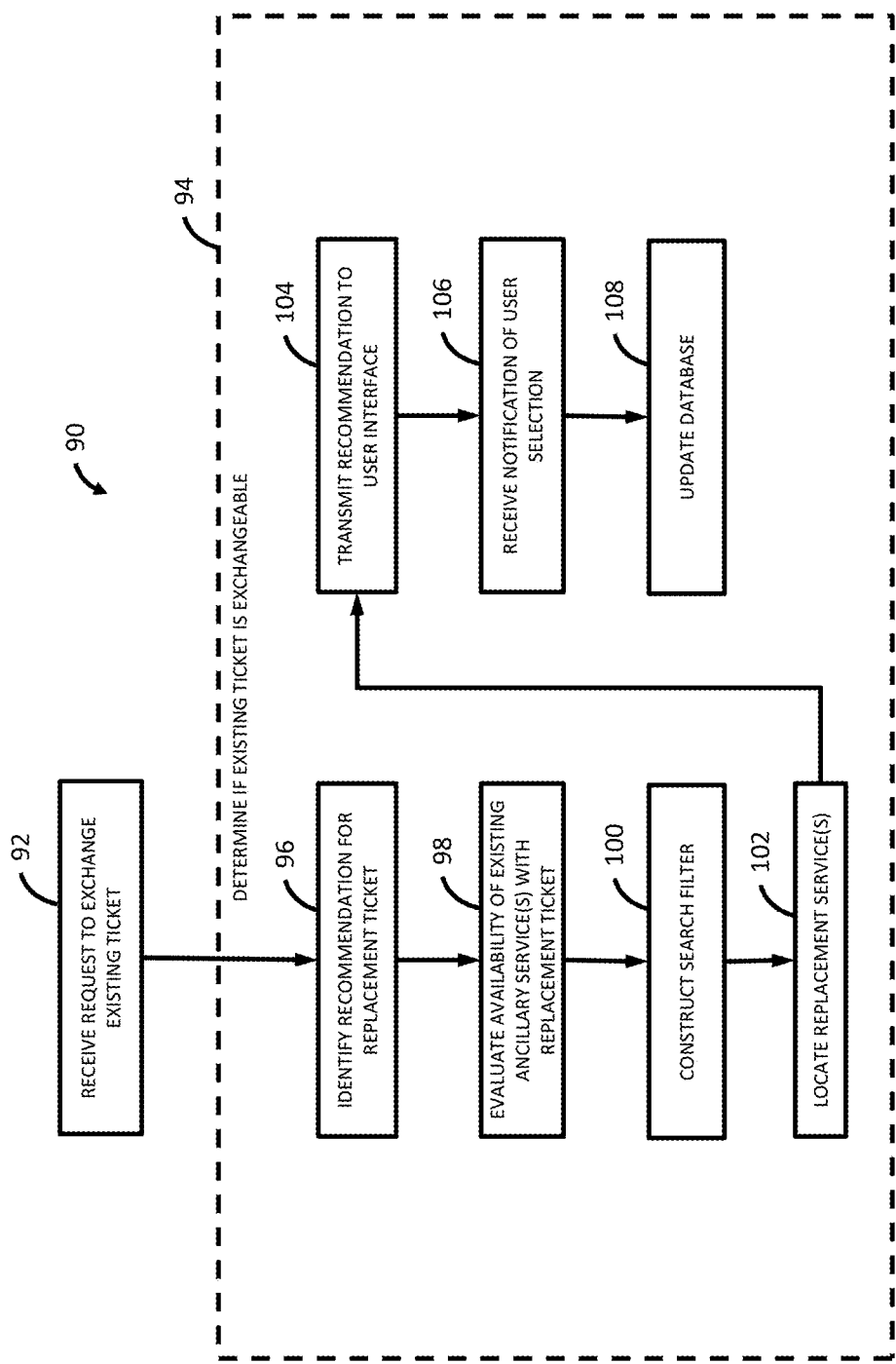
FIG. 6 is a flowchart illustrating an exemplary method to process an itinerary change request.

Turning now to FIG. 6, a method 90 may be performed by the computer system 18 to exchange an existing ticket 42 and associated existing ancillary service(s) 44 in accordance with an embodiment. In step 92, the computer system 18 may receive an itinerary change request 40 to exchange an existing ticket 42. The itinerary change request 40 may indicate one or more attributes of the existing ticket 42 to be modified and one or more existing ancillary services 44 may be associated with the existing ticket 42. The itinerary change request 40 may further specify additional desired or mandatory ancillary services 46. In block 94, the computer system 18 may determine if the existing ticket 42 is exchangeable by identifying a replacement ticket 50 and a replacement ancillary service 54. In step 96, the computer system 18 may identify an optimized recommendation 48 for the replacement ticket 50 based on the at least one attribute of the existing ticket 42 to be modified with the itinerary change request 40. In step 98, the computer system may evaluate availability of the existing ancillary service 44 of the existing ticket 42 with the first replacement ticket 50. In step 100, the system may construct a search filter that includes category descriptions for both the ancillary service (S) and a similarity score. In step 102, the computer system 18 may locate the first replacement ancillary service 54 stored within a database based on the category descriptions of both the search filter and the similarity score. Moreover, the similarity score may represent a value indicating a degree of similarity between the existing ancillary service 44 and the first replacement ancillary service 54. In step 104, the computer system 18 may transmit the recommendation for the first replacement ticket 50 and first replacement ancillary service 54 to a user interface. In step 106, the computer system may receive notification of a user selection of the first replacement ticket 50 and first replacement service at the user interface. In step 108, the computer system may update the database by increasing the value of the similarity score of the first replacement ancillary service 54.

In an embodiment, a method to exchange flight tickets takes into account ancillary services and proposes recommendations based on the initially purchased package, thereby offering the possibility to qualify mandatory versus optional services as inputs, as well as to request new services explicitly. Furthermore, the recommendations may be selected and ranked based on similarity, relevancy, and/or customer preference. Similar services may be computed to replace invalid services by utilizing service exchange rules, service similarity rules, and/or a similarity levels database. Thus, relevant services may be offered based on the new fare conditions as well as attributes of the previous services. Moreover, relevant services may be offered based on how the previous services have been exchanged in the past by considering general customer selections as well as individual customer profiles.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a communication network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A travel reservation system comprising:
one or more processors; and
a memory coupled with the one or more processors, the memory including instructions that, when executed by the one or more processors, cause the one or more processors to:
train a machine-learned model based on a characteristic-service relationship process for each iteration of a plurality of iterations by causing the one or more processors to:
obtain historical replacement service data stored within a similarity database, wherein the similarity database is populated with initial similarity values using rules based on defined attributes associated with ancillary services;
evaluate the historical replacement service data corresponding to one or more selected replacement services from the ancillary services associated with at least one traveler;
count a number of times a characteristic of the at least one traveler is associated with a certain ancillary service; and
select one or more characteristic-service relationship features for inclusion in the machine-learned characteristic-service relationship process using a predefined statistical threshold that defines a minimal causal relationship that exists between a particular characteristic-service relationship feature and patterns before that particular characteristic-service relationship feature is included in the machine-learned characteristic-service relationship process;
receive a request to exchange an existing ticket of a traveler, wherein an ancillary service is associated with the existing ticket and the request indicates at least one attribute of the existing ticket to be modified;
compute and store, via the machine-learned characteristic-service relationship process, characteristic-service relationships based on a characteristic of the traveler, the existing ticket, and an existing service to a replacement service;
determine, in response to receiving the request, that the existing ticket is exchangeable;
simultaneously identify, in response to determining that the existing ticket is exchangeable, a recommendation for a replacement ticket and a recommendation for a replacement service by causing the one or more processors to:
(i) identify the recommendation for the replacement ticket based on the at least one attribute of the existing ticket to be modified with the request; and simultaneously
(ii) identify the recommendation for the replacement service by causing the travel reservation system to:
evaluate availability of the ancillary service of the existing ticket with the recommended replacement ticket;
construct a search filter, wherein the search filter includes a category description for the ancillary service and a category description for a similarity score, wherein the similarity score represents a value indicating a degree of similarity between the ancillary service and each identified replacement service;
identify a first replacement service and a second replacement service stored within the similarity database based on the category description for the ancillary service and the category description for the similarity score;
determine a first weight for the first replacement service, wherein the first weight represents a first probability based on: (i) determining, via the machine-learned characteristic-service relationship process, that a first count for a first characteristic-classification relationship associated with the first replacement service and the traveler is within a first predefined range, and (ii) historical data indicating that the replacement ticket with the first replacement service will be selected;
determine a second weight for the second replacement service, wherein the second weight represents a second probability based on: (i) determining, via the machine-learned characteristic-service relationship process, that a second count for a second characteristic-classification relationship associated with the second replacement service and the traveler is within a second predefined range, and (ii) historical data indicating that the replacement ticket with the second replacement service will be selected;
calculate a first total cost for the first replacement service combined with the replacement ticket and a second total cost for the second replacement service combined with the replacement ticket based on the first weight, the second weight, and a price of the replacement ticket; and
determine, based on a ranking of the first total cost and the second total cost, a recommended replacement service between the first replacement service and the second replacement service;
transmit, to a user interface, the recommendation for the replacement ticket together with the recommended replacement service;
receive a notification indicating that the replacement ticket and the recommended replacement service have been selected at the user interface;
determine a relevancy metric and a similarity metric of future traveler interactions with the travel reservation system based on the selected replacement ticket and the recommended replacement service; and
update the similarity database, based on the determined relevancy metric and the similarity metric, by increasing the value of the similarity score of the recommended replacement service.

2. The travel reservation system of claim 1 wherein a price is associated with the ancillary service, and the instructions cause the one or more processors to evaluate the availability of the ancillary service with the replacement ticket by causing the one or more processors to:
compare a first combination between the ancillary service and the existing ticket against a second combination of the replacement ticket and the first replacement service;
determine that the ancillary service is irrelevant to the replacement ticket based on the comparison between the first combination and the second combination; and
in response to the ancillary service being determined to be irrelevant to the replacement ticket, either refund the price or apply the price towards another ancillary service.

3. The travel reservation system of claim 1 wherein the instructions cause the one or more processors to evaluate the availability of the ancillary service with the replacement ticket by causing the one or more processors to:
  determine that the ancillary service is relevant to the replacement ticket based on at least one relevancy check.

4. The travel reservation system of claim 1 wherein the ancillary service represents a meal service, the first replacement service is a replacement meal service, and the instructions cause the one or more processors to transmit, to the user interface, the replacement ticket together with the first replacement service by causing the one or more processors to:
  determine that the meal service is compatible with the replacement ticket based on a departure time and an arrival time of an itinerary associated with the replacement ticket.

5. The travel reservation system of claim 1 wherein the instructions, when executed by the one or more processors, further cause the one or more processors to:
  determine that the ancillary service of the existing ticket is included with the price of the replacement ticket; and
  transmit, to the user interface, an indicator that the first replacement service is included with the price of the replacement ticket in response to the ancillary service of the existing ticket being determined to be included with the price of the replacement ticket, wherein the indicator is either a notice or a flag.

6. The travel reservation system of claim 1 wherein the instructions, when executed by the one or more processors, further cause the one or more processors to:
  determine that the ancillary service of the existing ticket is not included in the price of the replacement ticket; and
  transmit, to the user interface, a cost associated with the first replacement service in response to the ancillary service of the existing ticket being determined to be not included in the price of the replacement ticket.

7. The travel reservation system of claim 1, wherein the replacement ticket is a first replacement ticket, and the instructions, when executed by the one or more processors, further cause the one or more processors to:
  in response to determining that the ancillary service of the existing ticket is not applicable with the first replacement ticket, simultaneously identify a second replacement ticket and a third replacement service by causing the system to:
    identify a second recommendation for the first replacement ticket, wherein the second recommendation is based on the at least one attribute of the existing ticket to be modified with the request; and
    locate the third replacement service stored within the database based on the category description for the ancillary service and the category description for the similarity score.

8. The travel reservation system of claim 7 wherein the instructions, when executed by the one or more processors, further cause the one or more processors to:
  determine a first score for the recommendation for the first replacement ticket together with the first replacement service, wherein the first score is based on a criteria;
  determine a second score for the recommendation for the second replacement ticket together with the second replacement service, wherein the second score is based on the criteria; and
  determine a high score by comparing the first score and the second score together, wherein the high score indicates a best recommendation for either the first replacement ticket or the second replacement ticket together with a replacement service.

9. The travel reservation system of claim 8 wherein the instructions, when executed by the one or more processors, further cause the one or more processors to:
  transmit, to the user interface, the best recommendation along with an indicator that indicates the best recommendation includes the high score.

10. The travel reservation system of claim 9 wherein the criteria indicates a solution having lowest cost and a minimum set of services, a solution having lowest cost and a same level of service as the existing ticket, or a compromise between cost and a level of service.

11. A method comprising:
  training a machine-learned model based on a characteristic-service relationship process for each iteration of a plurality of iterations by:
    obtaining historical replacement service data stored within a similarity database, wherein the similarity database is populated with initial similarity values using rules based on defined attributes associated with ancillary services;
    evaluating the historical replacement service data corresponding to one or more selected replacement services from the ancillary services associated with at least one traveler;
    counting a number of times a characteristic of the at least one traveler is associated with a certain ancillary service; and
    selecting one or more characteristic-service relationship features for inclusion in the machine-learned characteristic-service relationship process using a pre-defined statistical threshold that defines a minimal causal relationship that exists between a particular characteristic-service relationship feature and patterns before that particular characteristic-service relationship feature is included in the machine-learned characteristic-service relationship process;
  receiving, by a computer of a travel reservation system, a request to exchange an existing ticket of a traveler, wherein an ancillary service is associated with the existing ticket and the request indicates at least one attribute of the existing ticket to be modified;
  computing and storing, via the machine-learned characteristic-service relationship process, characteristic-service relationships based on a characteristic of the traveler, the existing ticket, and an existing service to a replacement service;
  determining, in response to receiving the request, that the existing ticket is exchangeable by the computer; and
  in response to determining that the existing ticket is exchangeable, simultaneously identifying a recommendation for a replacement ticket and a recommendation for a replacement service by:
    (i) identifying the recommendation for the replacement ticket based on the at least one attribute of the existing ticket to be modified with the request; and simultaneously
    (ii) identifying the recommendation for the replacement service by:
      evaluating, by the computer, availability of the ancillary service of the existing ticket with the recommended replacement ticket;
      constructing a search filter by the computer, wherein the search filter includes a category description for the ancillary service and a category description for a similarity score, wherein the similarity score represents a value indicating a degree of similarity between the ancillary service and each identified replacement service;

identifying, by the computer, a first replacement service and a second replacement service stored within the similarity database based on the category description for the ancillary service and the category description for the similarity score;

determining a first weight for the first replacement service, wherein the first weight represents a first probability based on: (i) determining, via the machine-learned characteristic-service relationship process, that a first count for a first characteristic-classification relationship associated with the first replacement service and the traveler is within a first predefined range, and (ii) historical data indicating that the replacement ticket with the first replacement service will be selected;

determining a second weight for the second replacement service, wherein the second weight represents a second probability based on: (i) determining, via the machine-learned characteristic-service relationship process, that a second count for a second characteristic-classification relationship associated with the second replacement service and the traveler is within a second predefined range, and (ii) historical data indicating that the replacement ticket with the second replacement service will be selected;

calculating a first total cost for the first replacement service combined with the replacement ticket and a second total cost for the second replacement service combined with the replacement ticket based on the first weight, the second weight, and a price of the replacement ticket; and determining, based on a ranking of the first total cost and the second total cost, a recommended replacement service between the first replacement service and the second replacement service;

transmitting, to a user interface, the recommendation for the replacement ticket together with the recommended replacement service;

receiving a notification indicating that the replacement ticket and the recommended replacement service have been selected at the user interface;

determining a relevancy metric and a similarity metric of future traveler interactions with the travel reservation system based on the selected replacement ticket and the recommended replacement service; and updating the similarity database, based on the determined relevancy metric and the similarity metric, by increasing the value of the similarity score of the recommended replacement service.

12. The method of claim 11 wherein evaluating the availability of the ancillary service with the replacement ticket comprises:

comparing a first combination between the ancillary service and the existing ticket against a second combination of the replacement ticket and the first replacement service;

determining that the ancillary service is irrelevant to the replacement ticket based on the comparison between the first combination and the second combination; and in response to the ancillary service being determined to be irrelevant to the replacement ticket, either refunding a price associated with the ancillary service or applying the price associated with the ancillary service towards another ancillary service.

13. The method of claim 11 wherein evaluating the availability of the ancillary service with the replacement ticket comprises:

determining that the ancillary service is relevant to the replacement ticket based on at least one relevancy check.

14. The method of claim 11 wherein the ancillary service represents a meal service, the first replacement service is a replacement meal service, and transmitting, to the user interface, the replacement ticket together with the first replacement service comprises:

determining that the meal service is compatible with the replacement ticket based on a departure time and an arrival time of an itinerary associated with the replacement ticket.

15. The method of claim 11 further comprising:

determining that the ancillary service of the existing ticket is included with the price of the replacement ticket; and transmitting, to the user interface, an indicator that the first replacement service is included with the price of the replacement ticket in response to the ancillary service of the existing ticket being determined to be included with the price of the replacement ticket, wherein the indicator is either a notice or a flag.

16. The method of claim 11 further comprising:

determining that the ancillary service of the existing ticket is not included in the price of the replacement ticket; and transmitting, to the user interface, a cost associated with the first replacement service in response to the ancillary service of the existing ticket being determined to be not included in the price of the replacement ticket.

17. The method of claim 11, wherein the replacement ticket is a first replacement ticket, the method further comprising:

in response to determining that the ancillary service of the existing ticket is not applicable with the first replacement ticket, simultaneously identifying a second replacement ticket and a second replacement service by:

identifying a second recommendation for the first replacement ticket, wherein the second recommendation is based on the at least one attribute of the existing ticket to be modified with the request; and locating, by the computer, the second replacement service stored within the database based on the category description for the ancillary service and the category description for the similarity score.

18. The method of claim 17 further comprising:

determining a first score for the recommendation for the first replacement ticket together with the first replacement service, wherein the first score is based on a criteria;

determining a second score for the recommendation for the second replacement ticket together with the second replacement service, wherein the second score is based on the criteria; and determining a high score by comparing the first score and the second score together, wherein the high score indicates a best recommendation for the first replacement ticket or the second replacement ticket together with a replacement service.

19. The method of claim 18 further comprising:
transmitting, to the user interface, the best recommendation along with an indicator that indicates the best recommendation includes the high score.

20. The method of claim 18 wherein the criteria indicates a solution having lowest cost and a minimum set of services, a solution having lowest cost and a same level of service as the existing ticket, or a compromise between cost and a level of service.

21. A computer program product comprising:
a non-transitory computer-readable storage medium; and
instructions stored on the non-transitory computer-readable storage medium that, when executed by one or more processors, cause the one or more processors to:
train a machine-learned model based on a characteristic-service relationship process for each iteration of a plurality of iterations by causing the one or more processors to:
obtain historical replacement service data stored within a similarity database, wherein the similarity database is populated with initial similarity values using rules based on defined attributes associated with ancillary services;
evaluate the historical replacement service data corresponding to one or more selected replacement services from the ancillary services associated with at least one traveler;
count a number of times a characteristic of the at least one traveler is associated with a certain ancillary service; and
select one or more characteristic-service relationship features for inclusion in the machine-learned characteristic-service relationship process using a predefined statistical threshold that defines a minimal causal relationship that exists between a particular characteristic-service relationship feature and patterns before that particular characteristic-service relationship feature is included in the machine-learned characteristic-service relationship process;
receive a request to exchange an existing ticket of a traveler, wherein an ancillary service is associated with the existing ticket and the request indicates at least one attribute of the existing ticket to be modified;
compute and store, via the machine-learned characteristic-service relationship process, characteristic-service relationships based on a characteristic of the traveler, the existing ticket, and an existing service to a replacement service;
determine, in response to receiving the request, that the existing ticket is exchangeable;
simultaneously identify, in response to determining that the existing ticket is exchangeable, a recommendation for a replacement ticket and a recommendation for a replacement service by causing the one or more processors to:
(i) identify the recommendation for the replacement ticket based on the at least one attribute of the existing ticket to be modified with the request; and simultaneously
(ii) identify the recommendation for the replacement service by causing the one or more processors to:

evaluate availability of the ancillary service of the existing ticket with the recommended replacement ticket;
construct a search filter, wherein the search filter includes a category description for the ancillary service and a category description for a similarity score, wherein the similarity score represents a value indicating a degree of similarity between the ancillary service and each identified replacement service;
identify a first replacement service and a second replacement service stored within the similarity database based on the category description for the ancillary service and the category description for the similarity score;
determine a first weight for the first replacement service, wherein the first weight represents a first probability based on: (i) determining, via the machine-learned characteristic-service relationship process, that a first count for a first characteristic-classification relationship associated with the first replacement service and the traveler is within a first predefined range, and (ii) historical data indicating that the replacement ticket with the first replacement service will be selected;
determine a second weight for the second replacement service, wherein the second weight represents a second probability based on: (i) determining, via the machine-learned characteristic-service relationship process, that a second count for a second characteristic-classification relationship associated with the second replacement service and the traveler is within a second predefined range, and (ii) historical data indicating that the replacement ticket with the second replacement service will be selected;
calculate a first total cost for the first replacement service combined with the replacement ticket and a second total cost for the second replacement service combined with the replacement ticket based on the first weight, the second weight, and a price of the replacement ticket; and
determine, based on a ranking of the first total cost and the second total cost, a recommended replacement service between the first replacement service and the second replacement service;
transmit, to a user interface, the recommendation for the replacement ticket together with the recommended replacement service;
receive a notification indicating that the replacement ticket and the recommended replacement service have been selected at the user interface;
determine a relevancy metric and a similarity metric of future traveler interactions with a travel reservation system based on the selected replacement ticket and the recommended replacement service; and
update the similarity database, based on the determined relevancy metric and the similarity metric, by increasing the value of the similarity score of the recommended replacement service.

* * * * *